US005291731A

United States Patent [19]

Duva

[11] Patent Number: 5,291,731

[45] Date of Patent: Mar. 8, 1994

[54] TORPEDO WITH EXTERNAL COMBUSTION ENGINE HAVING AN EXPANSION CHAMBER

[75] Inventor: Anthony W. Duva, Middletown, R.I.

[73] Assignee: The United States of America as represented by the Secretary of the Navy, Washington, D.C.

[21] Appl. No.: 35,862

[22] Filed: Mar. 23, 1993

[51] Int. Cl.[5] .................. F02C 5/00

[52] U.S. Cl. .................. 60/39.6; 60/39.462

[58] Field of Search .................. 60/39.462, 39.6, 39.63; 91/499, 503, 507; 114/20.2

[56] References Cited

U.S. PATENT DOCUMENTS 3,151,527 10/1964 Hamlin .................. 91/507
3,564,846 2/1971 Moore .................. 60/39.462 X
4,047,380 9/1977 Heffernan .................. 60/39.462 X

*Primary Examiner*—Richard A. Bertsch
*Attorney, Agent, or Firm*—Michael J. McGowan; Prithvi C. Lall; Michael F. Oglo

[57] ABSTRACT

An external combustion engine having a combustion expansion chamber. The engine includes a combustion chamber for generating a high-pressure, energized gas from a monopropellant fuel, and a cylinder for receiving the energized gas through a rotary valve to perform work on a cylinder disposed therein. A baffle plate is positioned between the combustion area and expansion area for reducing the pressure of the gas. The combustion area and expansion area are separated by a baffle plate having a flow area which is sufficiently large to eliminate the transmission of pressure pulsations from the combustion area to the expansion area while being small enough to provide for substantially complete combustion in the combustion area. The engine is particularly well suited for use in a torpedo.

5 Claims, 2 Drawing Sheets

TORPEDO WITH EXTERNAL COMBUSTION ENGINE HAVING AN EXPANSION CHAMBER

STATEMENT OF GOVERNMENT INTEREST

The invention described herein may be manufactured and used by or for the Government of the United States of America for governmental purposes without the payment of any royalties thereon or therefor.

CROSS REFERENCES TO RELATED PATENT APPLICATIONS

The instant application is related to two co-pending U.S. patent applications entitled HEAT REGENERATIVE EXTERNAL COMBUSTION ENGINE; and COOLANT SUBSYSTEM FOR A TORPEDO PROPULSION SYSTEM having same filing date.

BACKGROUND OF THE INVENTION (1) Field of the Invention

This invention relates generally to external combustion expander-type engines. More particularly, the present invention relates to an external combustion expander-type engine having an expansion chamber between the combustion chamber and hot gas distributor rotary valve.

(2) Description of the Prior Art

It is known to propel a torpedo with a propulsion system which uses an external cumbustion expander-type engine in conjunction with a monopropellant fuel. In this type of system, a solid initiator monopropellant fuel is combusted in the combustion chamber, producing a hot, energized gas which commences drive action of the torpedo and initiates the entry of a liquid, pressure-sensitive, sustainer monopropellant fuel into the combustion chamber through a poppet valve. Assuming that the pressure in the combustion chamber is sufficiently high, heat generated in the combustion of the initiator propellant effects combustion of the initial quantity of sustainer propellant which is admitted to the combustion chamber. Subsequently, combustion of the sustainer fuel continues in a self-sustaining manner due to the high temperature and pressure in the chamber, i.e. part of the energy generated in combustion of the sustainer propellant is used to combust additional sustainer propellant.

In an external combustion torpedo engine of conventional design, the combustion chamber is subjected to pressure pulsations resulting from the distribution of hot combustion gas into engine cylinders via a rotary valve. These pressure pulsations result in incomplete combustion in the combustion chamber, particularly when the engine is operated at a low speed. As a result, afterburning tends to occur downstream from the combustion chamber, throughout the entire system, resulting in overall system inefficiency. Presence of afterburning in the exhaust valve and downstream thereof to the ocean has been confirmed. Furthermore, the pressure pulsations can generate a substantial amount of noise, which can be disadvantageous to the extent that such noise facilitates discovery of the location of the torpedo and the launching vessel.

SUMMARY OF THE INVENTION

It is an object of the invention to provide an external combustion expander-type engine having improved efficiency.

It is another object of the invention to provide an external combustion engine which generates less noise than a conventional external combustion engine.

Yet another object of the invention is to provide an external combustion engine in which afterburning is substantially prevented.

It is a further object of the invention to provide an external combustion engine which generates minimal pressure pulsations during operation.

These and other objects of the invention will become more apparent from the following description.

The above objects of the invention are realized by providing an external combustion expander-type engine having an expansion area for expanding the energized combustion gas. The external combustion engine of the invention comprises a combustion area for combusting a fuel to form an energized gas. The energized gas is then passed through a baffle plate into an expansion area in which the pressure of the gas is reduced. Subsequently, the expanded gas is passed through a gas inlet line in a rotary valve to a cylinder having a reciprocating piston disposed therein. The gas is expanded in moving the piston, thereby driving a drive shaft. The expanded gas is removed from the cylinder through an exhaust gas outlet port in the rotary valve, and is transferred to an exhaust passage through which it is removed from the engine. The flow area through the baffle plate is large enough to substantially eliminate the transmission of pressure pulsations to the combustion chamber, while being small enough to prevent combustion from taking place in the expansion area. The baffle plate includes a plurality of perforations, each of which has the configuration of a converging-diverging nozzle. The flow area through the baffle plate depends upon the flow rate of the energized gas, the type of monopropellant fuel which is used, the expected pressure and temperature of the combustion chamber, and other factors.

Another embodiment of the invention is a method for improving the combustion efficiency of an external combustion expander-type engine having a rotary valve for feeding an energized gas from a combustion chamber to a cylinder. The method comprises the steps of including an expansion chamber between the combustion chamber and the rotary valve, and transferring the energized gas into the expansion chamber in order to substantially prevent the transmission of pressure pulsations to the combustion chamber. The expansion chamber is separated from the combustion chamber by a baffle plate which includes perforations in the shape of converging-diverging nozzles. The perforations form an overall flow area of a size appropriate to eliminate the transmission of pressure pulsations to the combustion chamber, while preventing uncombusted monopropellant from being carried into the expansion area.

Yet another embodiment of the invention is a method for reducing the noise generated in the operation of an external combustion expander-type engine having a rotary valve for feeding an energized gas from a combustion chamber to a cylinder. The method comprises the step of including an expansion chamber between the combustion chamber and the rotary valve. The expansion chamber is separated from the combustion chamber by a perforated baffle plate which forms an overall flow area of a size appropriate to eliminate the transmission of pressure pulsations from the combustion chamber to the expansion area while substantially preventing the entry of uncombusted monopropellant fuel into the expansion area.

DESCRIPTION OF THE PREFERRED EMBODIMENT

Figure 1:
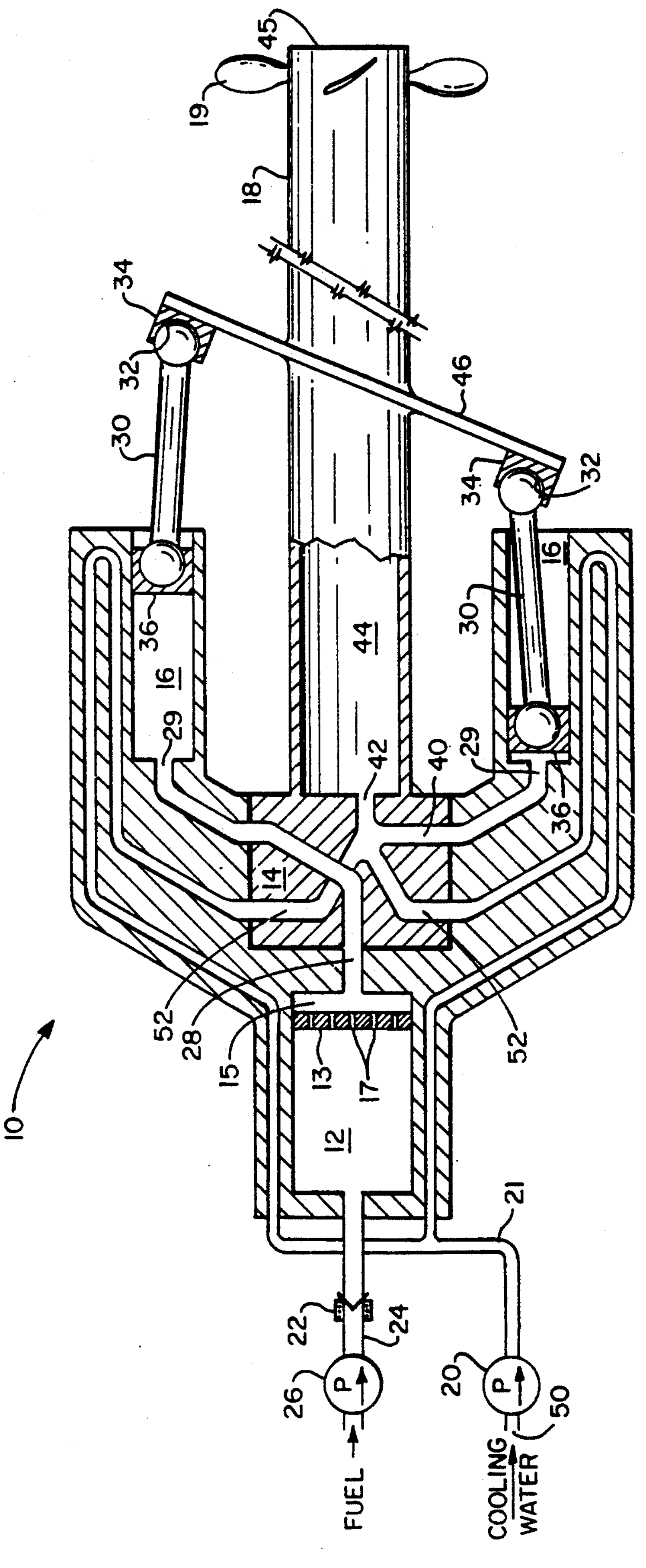
FIG. 1 is a schematic sectional view of an external combustion torpedo engine having an expansion chamber in accordance with the present invention.

With reference to FIG. 1, a torpedo engine having an expansion chamber according to the invention is generally designated by the numeral 10. The torpedo engine 10 is an external combustion engine having a cylindrical combustion chamber 12 for generating a high-pressure, energized combustion gas from a monopropellant fuel. The energized gas is passed from the combustion chamber 12 through a perforated baffle plate 13 to an expansion chamber 15 in order to reduce the pressure of the gas in an amount sufficient to eliminate pressure pulsations in the engine 10. The reduced-pressure gas is then transferred through a conventional rotary valve 14, which is connected to the combustion chamber, to six cylinders 16 that are arranged around a central drive shaft 18, which is coaxial with, and splined to, the rotary valve 14. The gas is expanded in the cylinders 16 in order to drive the drive shaft 18. A propeller 19 is positioned at the outer end of the drive shaft 18 for propelling the torpedo after it is launched. The torpedo engine has a coolant subsystem which includes a coolant pump 20 and a coolant passage 21 for circulating seawater around the combustion chamber 12 and the cylinders 16 during operation of the engine.

It is to be appreciated that with the exception of certain improvements to the engine, as described herein, including the expansion chamber 15, the operation and construction of torpedo engine 10 is conventional and known.

The torpedo engine operates in the following manner. Before the torpedo is launched, the combustion chamber 12 contains a solid initiator monopropellant (not shown) which is ignited when launch occurs. As the initiator propellant combusts, it generates a hot, energized gas which commences drive action of the torpedo engine 10 and opens a poppet valve 22 at a fuel inlet port 24 to the combustion chamber 12 to admit a liquid sustainer propellant into the combustion chamber 12. The sustainer propellant, which is a monopropellant fuel, such as OTTO Fuel II, is pumped by a pump 26 through the fuel inlet port 24 into the combustion chamber 12. The heat generated by combustion of the initiator propellant commences combustion of the sustainer propellant to form a hot, high-pressure, energized gas. Commonly, the operating pressure in the combustion chamber 12 is on the order of 800–1000 p.s.i. As a portion of the energized gas in the combustion chamber 12 is removed from the combustion chamber in a conventional manner, additional sustainer propellant is pumped into the combustion chamber 12 and is combusted due to the high temperature and pressure in the chamber 12.

Figure 2:
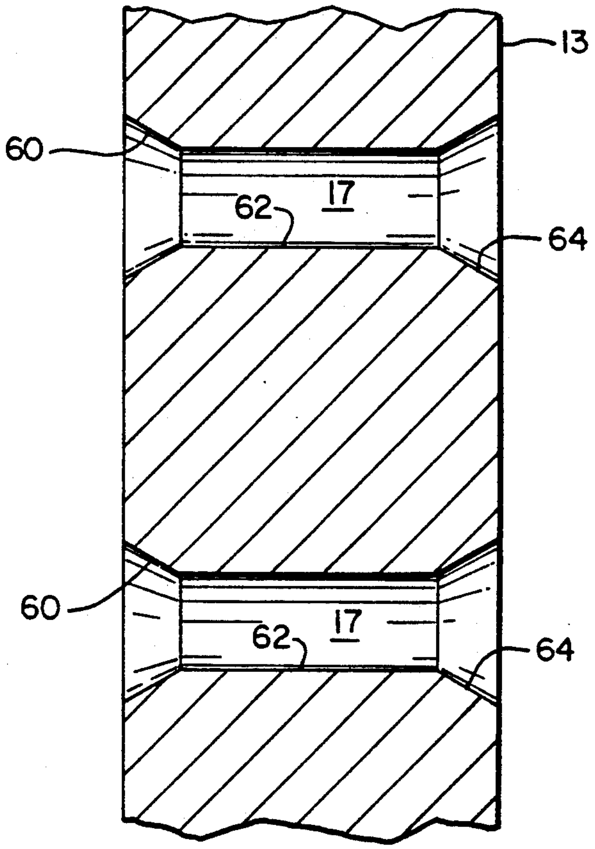
FIG. 2 is a sectional view of the baffle plate which defines the expansion chamber of the invention.

As the energized, high pressure gas enters the expansion chamber 15, its pressure is reduced to about 600–800 p.s.i. This pressure drop is brought about by sending the gas through the perforations 17 in the baffle plate. The perforations 17 each have a cross-sectional configuration in the form of a converging-diverging nozzle, as shown in FIG. 2. The nozzle-shaped perforations have a converging inlet portion 60, a cylindrical central channel 62 having a constant diameter, and a diverging outlet portion 64.

Reduced-pressure, energized gas is removed from the expansion chamber 15 through an energized gas channel 28 in the rotary valve 14. The energized gas is distributed through the energized gas channel 28 in sequence to the six cylinders 16, which are evenly spaced from each other and from the drive shaft 18. Two of the six cylinders are seen in FIG. 1. The energized gas is delivered sequentially via the energized gas channel 28 to the inlet 29 of each cylinder. The inlets 29 are positioned around the rotary valve 14 for sequential registry with the channel 28 in a known manner as the rotary valve rotates. Each cylinder 16 contains a reciprocating piston 30 which is connected at its outer end 32, outside the cylinder body, to a non-rotating wobble plate 34 which is configured in a conventional manner. The energized gas which is distributed to the cylinders 16 performs work on the pistons 30 sequentially by individually moving the inner end 36 of each piston 30 linearly toward the rear end of the torpedo engine. Due to the interconnection of all of the pistons 22 by the tilted wobble plate 34, movement of one particular piston 30 toward the rear end of the engine 10 causes a piston on the directly opposite, axially spaced side of the drive shaft to move away from the rear end of the torpedo engine 10. As a particular piston 30 moves away from the rear end of the engine 10, it forces spent gas through an exhaust gas channel 40 in the rotary valve 14 in a known manner. The gas in the exhaust gas channel 40 is introduced into an exhaust gas-coolant channel 42 in the rotary valve 14 and is subsequently transferred to an elongated exhaust duct 44 which is located within the drive shaft 18. The exhaust gas is then emitted from the torpedo engine 10 into the seawater at the outer end 45 of the exhaust duct 44.

The wobble plate 34 is connected by a bearing to a tilted, rotating swash plate 46. The non-rotating, wobbling movement of the wobble plate 34 rotates the swash plate 46 continuously in one direction to drive the central drive shaft 18, which is rigidly connected to the swash plate 46 in a co-axial arrangement. Rotation of the drive shaft 18 drives the propeller 19, which is fixed to the outer end of the drive shaft 18.

The torpedo engine 10 includes a coolant subsystem having a seawater inlet 50 which is opened after the torpedo is launched. The inlet 50, which is near the combustion chamber 12, admits cooling water into the coolant passage 21. The seawater at inlet 50 is pumped through the coolant passage 21 by the coolant pump 20. The coolant passage 21 includes annular segments formed around the outer surfaces of the combustion chamber 12 and each of the six cylinders 16. After circulating around the combustion chamber 12 and cylinders 16, the seawater in passage 21 enters a coolant channel 52 in the rotary valve 16 in a conventional manner and is then transferred into the exhaust gas-coolant channel 42 in the rotary valve 14, where it is mixed with exhaust gas and is subsequently removed from the torpedo engine with the exhaust gas through the exhaust duct 44.

The expansion chamber 15 preferably is custom-designed for use under particular process conditions. For ease of construction, the expansion chamber 15 can be formed integrally with the combustion chamber 12 as part of a single large chamber, which is partitioned into two chambers by the baffle plate. The expansion chamber can be larger or smaller than the combustion chamber, but should be sufficiently large to result in the reduction, and preferably the substantial elimination, of pressure pulses in the combustion chamber 12. In a preferred embodiment, the baffle plate is of the orifice type, and has a total thickness of ¼", including entrance modifications in the form of the converging inlet portion 60, and exit modifications in the form of the diverging exit portion 64. The one or more perforations in the baffle plate preferably are generally circular, and when plural are evenly distributed on the face of the baffle plate. The optimum design of the baffle plate will depend upon the anticipated use of the engine, and will depend upon temperature and pressure in the combustion chamber, the flow rate of the energized gas through the expansion chamber, and the type of sustainer monopropellant fuel which is used. For a particular application, the baffle plate and expansion chamber are best designed using a combination of fluid flow equations and empirical data. When designing specifically for OTTO Fuel II, the baffle plate should be sized to maintain a minimum absolute pressure of 1200 p.s.i. The expansion chamber should be no less than one-third the size of the combustion chamber and result in an intermediate pressure between the engine and combustion chamber of approximately 150–200 p.s.i. less than chamber pressure and 100–200 p.s.i. higher than the cylinder pressure.

Obviously, many modifications and variations of the present invention may become apparent in light of the above teachings. For example, as an alternative to the above described approach of achieving combustion stability through increased absolute combustion chamber pressure, a flame trap type of baffle plate could be employed. Such plates are conventional and known in the art, and available in a variety of physical dimensions and configurations.

It is therefore to be understood that within the scope of the appended claims, the invention may be practiced otherwise than as specifically described.

What is claimed is:

1. A torpedo having an external combustion expander-type engine, comprising:

a combustion chamber for combusting a monopropellant fuel to form an energized gas;

an expansion area for receiving energized gas from the combustion chamber and expanding the energized gas, the expansion area being separated from the combustion chamber by a baffle plate having an effective flow area which is sufficiently large to eliminate the transmission of pressure pulsations to the combustion chamber while being small enough to substantially prevent combustion in the expansion area;

a cylinder fluidly connected to the expansion area for receiving the energized gas from the expansion area, the cylinder having a piston disposed therein, the energized gas being expanded in the cylinder to move the piston;

a drive shaft driven by the piston;

an exhaust passage formed in the drive shaft for removing spent gas from the engine; and a rotary valve for transferring the energized gas from the expansion area to the cylinder and for transferring the expanded gas from the cylinder to the exhaust passage.

2. A torpedo according to claim 1, wherein the baffle plate is of the orifice type.

3. A torpedo according to claim 1, wherein the combustion chamber and expansion area are integrally formed as a single chamber.

4. A method for improving the combustion efficiency of an external combustion expander-type torpedo engine comprising a combustion chamber for combusting a monopropellant fuel to form an energized gas, a cylinder for receiving the energized gas, the cylinder having a piston disposed therein, the energized gas being expanded in the cylinder to move the piston, a drive shaft driven by the piston, an exhaust passage operatively cooperating with the reverse stroke of the piston for expelling expanded gas from the engine, and a rotary valve for transferring energized gas into and out of the cylinder, the method comprising:

transferring the energized gas from the combustion chamber through a perforated baffle plate and into an expansion area in order to reduce the pressure of the energized gas from a monopropellant combustion pressure to a lower pressure, wherein the perforated baffle plate provides for an effective flow area which is sufficiently large to eliminate the transmission of pressure pulsations to the combustion chamber, while being small enough to substantially prevent uncombusted monopropellant from being carried into the expansion area.

5. A method for reducing the noise generated by an external combustion expander-type torpedo engine comprising a rotatable combustion chamber for combusting a monopropellant fuel to form an energized gas, a cylinder for receiving the energized gas, the cylinder having a piston disposed therein, the energized gas being expanded in the cylinder to move the piston, a drive shaft driven by the piston, an exhaust passage operatively cooperating with the reverse stroke of the piston to expel expanded gas from the engine, and a rotary valve for transferring energized gas into and out of the cylinder, the method comprising:

transferring the energized gas from the combustion chamber through a perforated baffle plate and into an expansion area in order to reduce the pressure of the energized gas from a monopropellant combustion pressure to a lower pressure, wherein the perforated baffle plate provides for an effective flow area which is sufficiently large to eliminate the transmission of pressure pulsations to the combustion chamber, while being small enough to substantially prevent uncombusted monopropellant from being carried into the expansion area.

* * * * *